UNITED STATES PATENT OFFICE.

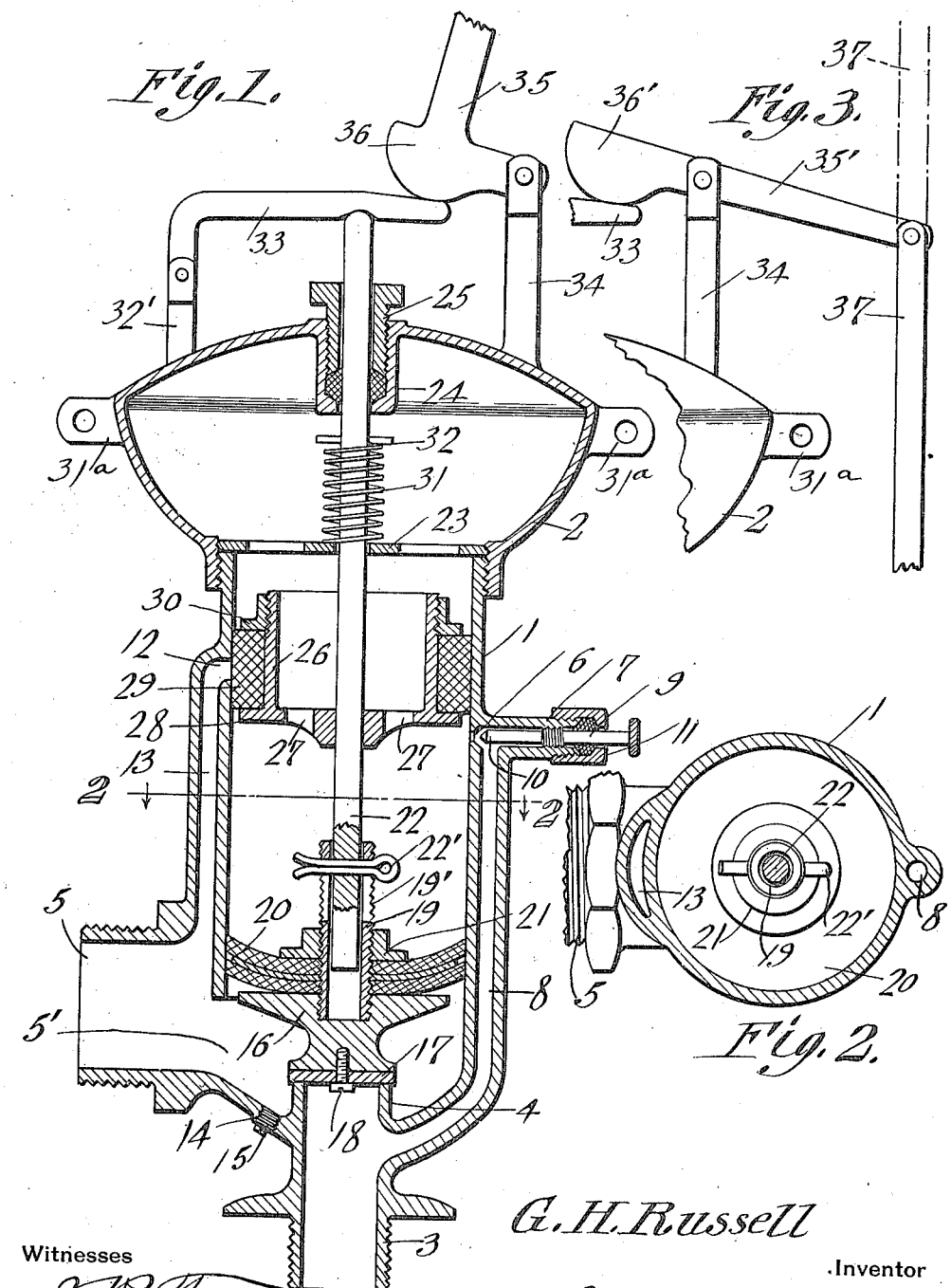

GEORGE H. RUSSELL, OF FLORENCE, ALABAMA.

FLUSHING-VALVE.

1,221,223.  Specification of Letters Patent.  Patented Apr. 3, 1917.

Application filed October 10, 1916. Serial No. 124,876.

*To all whom it may concern:*

Be it known that I, GEORGE H. RUSSELL, a citizen of the United States, residing at Florence, in the county of Lauderdale and State of Alabama, have invented a new and useful Flushing-Valve, of which the following is a specification.

The present invention appertains to flushing devices for water closets, etc., and aims to provide a novel and improved appliance of that character so constructed as to provide an automatically operating valve for cutting off the flow of water after the water has been permitted, by manual opertaion, to flow and provide the flushing action, the valve being opened and closed by the water pressure, and the opening of the valve being accomplished by relieving the water pressure which is done by the manual operation.

A further object of the invention is to provide a flushing device having the characteristics above noted and being compact, simple and inexpensive in construction, as well as being thoroughly feasible, satisfactory and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a vertical median section of the device, portions being illustrated in elevation.

Fig. 2 is a horizontal section taken on the line 2—2 of Fig. 1.

Fig. 3 is a fragmental elevation illustrating a modification.

In carrying out the invention, there is provided a cylindrical casing 1 preferably disposed vertically, and a chambered head 2 is threadedly or otherwise engaged upon the upper end of the casing 1 to provide an extension therefor. The lower end of the casing 1 is provided with a contracted depending nipple 3 for the attachment of the water supply pipe, and said lower end of the casing is provided with a nozzle 4 projecting upwardly from the nipple 3. Projecting from one side of the casing 1 near the lower end thereof is an outlet nipple 5 which is connected to the bowl to convey the water thereto, and the casing 1 can be located adjacent to, above or below the bowl, since the water is supplied thereto under pressure. That side of the casing 1 opposite the outlet, is provided between its ends with a by-pass port 6, and a nipple 7 projecting outwardly from said port, and said side of the casing is also provided with a by-pass 8 communicating at one end with the port 6 and at its other end with the nipple or inlet 3. A valve stem 9 is threaded within the nipple 7 and is provided with a valve tip or needle 10 coöperable with the port 6 for controlling the flow of water form the by-pass 8 into the casing 1. A packing gland 11 is threaded upon the nipple 7 to compress the packing against the stem 9 for preventing leakage. The casing 1 is provided at that side opposite the port 6 with relief port 12 located slightly farther from the lower end of the casing than the port 6, the casing 1 having a relief passage 13 communicating at one end with the port 12 and at its other end with the nipple or water outlet 5. The casing 1 has an opening 5′ between the nipple or outlet 5 and the lower end of the casing in communication with the nozzle 4.

When the device is used under ground, to prevent the freezing of the water therein, or when it is otherwise desired to drain the water from the lower portion of the casing 1, the lower end of the casing can be provided with a drain aperture 14 at one side of the nozzle 4, through which the water can drain. Said aperture 14 can be closed by a removable plug 15 when it is not desired to have the aperture 14 open.

A valve member 16 is movable vertically within the lower portion of the casing 1 and has a packing disk or washer 17 secured to its lower surface by means of a screw 18 or otherwise, the disk or washer 17 being seatable upon the nozzle 4 to shut off the flow of water from the water inlet to the water outlet. An upstanding tubular member 19 has its lower end threadedly or otherwise engaged with the valve member 16, and packing disks or cups 20 are seated upon the member 16 and are clamped thereto by means of a nut 21 threaded upon the tubular member 19. The member 16 together with the washer 17 and packing caps 20 provide a sliding valve moved to open and closed positions by the water pressure. The area of the nozzle 4 is considerably smaller than the area of the casing 1, whereby when the valve is seated, the water pressure imposed upon the upper surface of the valve will overcome the water pressure imposed upon the lower surface of the valve within the nozzle 4, thus holding the valve seated.

A rod or stem 22 is disposed vertically within the casing, having its lower end slidably received by the tubular member 19, said tubular member having opposite longitudinal slots 19' through which a cotter pin 22' extends, said cotter pin being engaged with the rod 22. The rod 22 and main valve are thus connected for limited reciprocatory movement relative to one another. A spider or guide 23 is held at the upper end of the casing 1 by the head 2, and the rod 22 is slidable through the spider 23 and through a stuffing box 24 with which the top of the head 2 is provided, a gland 25 being threaded into the stuffing box to compress packing against the rod 22, to prevent leakage. A cup-shaped piston valve 26 has its bottom secured to the rod 22 above the main controlling valve, and the bottom of the valve 26 has openings 27 for the flow of water upwardly and downwardly through the valve without interference. The valve 26 has a lower outstanding flange 28 upon which an annular packing ring 29 is seated, said packing ring surrounding the valve 26, and the packing ring 29 is held in place by means of a nut or ring 30 threaded upon the valve 26. The packing ring 29 is fitted snugly within the casing 1 and is adapted to close the ports 6 and 12 at the different positions of the valve 26.

The rod 22 is spring raised by means of a coiled wire expansion spring 31 surrounding it and confined between the spider 23 and a pin 32 carried by the rod above the spider. The valve 26 is thus raised to normally cover the relief port 12, and uncover the by-pass port 6.

The head 2 can be provided with apertured lugs 31ª or other means for securing it to a support if desired, although the device can be mounted in various manners.

As a convenient means for depressing the rod 22, to start the flushing action, a compound lever is preferably employed. Thus, the head 2 is provided at one side of the rod 22 with a post 32' to which a lever 33 is fulcrumed, said lever bearing upon the upper end of the rod 22. The head 2 has a second post 34 opposite the post 32 to which a hand lever 35 is fulcrumed, said lever having a cam 36 bearing upon the free end of the lever 33, whereby when the lever 35 is swung in the proper direction, the lever 33 is depressed to move the rod 22 downwardly.

In operation, supposing the main valve to be seated upon the nozzle 4, and the piston valve 26 to be in raised position under the influence of the spring 31 to close the port 12, water can flow under pressure into the casing 1 by way of the by-pass 8 and port 6, the port 12 being closed, so as to prevent the escape of water, and the water pressure within the casing 1 in being imposed upon the main valve, will hold it seated against the nozzle 4, thus closing said nozzle. The main valve is thus held seated by the water pressure. When the rod 22 is depressed, the piston valve 26 is slid downwardly, to uncover the port 12, and cover the port 6. Thus, the pressure is relieved, since the water can escape from the casing 1 by way of the port 12 and relief passage 13 to the water outlet, and the water cannot flow into the casing 1 from the by-pass 8. As a consequence, the pressure above the main valve is relieved, so that the upward pressure of the water against the main valve from the nozzle 4 unseats said valve and moves it upwardly, thereby permitting the water to rush through the outlet from the nozzle to the bowl, to provide the flushing action, which is continued as long as the main valve remains unseated. When the rod 22 is released, the spring 31 slides said rod and the valve 26 upwardly, whereby the valve 26 is removed from the port 6 and again brought to position to cover the port 12. The water can then again flow through the by-pass into the casing 1, and the pressure will accumulate in the casing above the main valve, whereby the main valve is gradually forced downwardly by the pressure above it, to seat the lower reduced portion of the main valve against the nozzle 4 after the flushing action has continued for a period of time. The time consumed for the main valve to be seated by the water pressure, depends on the water pressure and the velocity at which the water is permitted to flow through the port 6 into the casing, which is controlled by the valve 10.

In the modification illustrated in Fig. 3, the lever 35' which has the cam 36' for operating the lever 33, is operated by a rod or link 37, which extends downwardly if the flushing device is elevated, as shown in full lines, and which extends upwardly, as shown in dotted lines, when the device is below the bowl.

Having thus described the invention, what is claimed as new is:

1. A flushing device embodying a casing having a water inlet nozzle at one end, and a water outlet, a valve slidable longitudinally withing the casing and seatable against said nozzle, the casing having a by-pass port and a relief port located at different distances from said nozzle and having a by-pass establishing communication between the by-pass port and the inlet nozzle, a spring-pressed valve slidable longitudinally in the casing toward and away from the aforesaid valve for normally closing the relief port and movable to close the by-pass port, and means for sliding the second mentioned valve having a limited sliding connection with the first mentioned valve.

2. A flushing device embodying a casing having a water inlet nozzle at one end of reduced area and a water outlet adjacent to said end, a valve slidable within the casing and seatable against the nozzle, the casing having a relief port and a by-pass port at different distances from said nozzle, and having a by-pass establishing communication between the by-pass port and inlet nozzle, a spring pressed rod projecting from the other end of the casing and having a limited sliding connection with said valve, and a piston valve secured to said rod and slidable within the casing to normally close the relief port and to close the by-pass port when the rod is moved against its spring tension.

In testimony that I claim the foregoing as my own, I have hereto affixed my signature in the presence of two witnesses.

GEORGE H. RUSSELL.

Witnesses:
C. D. HOOKS,
J. M. BENNETT.

Copies of this patent may be obtained for five cents each, by addressing the "Commissioner of Patents, Washington, D. C."